US011548377B2

(12) United States Patent
Wind et al.

(10) Patent No.: US 11,548,377 B2
(45) Date of Patent: Jan. 10, 2023

(54) DETECTING THE DEACTIVATION OF A FILLING DEVICE

(71) Applicant: KAUTEX TEXTRON GMBH & CO. KG, Bonn (DE)

(72) Inventors: Stefan Wind, Hennef (DE); Axel Barkow, Huerth (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 339 days.

(21) Appl. No.: 16/625,370

(22) PCT Filed: Jun. 25, 2018

(86) PCT No.: PCT/EP2018/066892
§ 371 (c)(1),
(2) Date: Dec. 20, 2019

(87) PCT Pub. No.: WO2019/002176
PCT Pub. Date: Jan. 3, 2019

(65) Prior Publication Data
US 2021/0362587 A1 Nov. 25, 2021

(30) Foreign Application Priority Data
Jun. 27, 2017 (DE) .................. 10 2017 114 270.3

(51) Int. Cl.
B60K 15/04 (2006.01)
B67D 7/36 (2010.01)
(Continued)

(52) U.S. Cl.
CPC ............. B60K 15/04 (2013.01); B67D 7/362 (2013.01); G05B 19/4155 (2013.01);
(Continued)

(58) Field of Classification Search
CPC ............ B60K 15/04; B60K 2015/0323; B60K 2015/049; B67D 7/362; G05B 2219/45076; G05B 19/4155
See application file for complete search history.

(56) References Cited

U.S. PATENT DOCUMENTS 5,669,361 A * 9/1997 Weissinger ...... B60K 15/03519
123/520
6,230,558 B1 5/2001 Miwa et al.
(Continued)

FOREIGN PATENT DOCUMENTS

CN 102410186 4/2012
CN 102869970 1/2013
(Continued)

OTHER PUBLICATIONS

International Search Report, dated Nov. 22, 2018, received in corresponding PCT Application No. PCT/EP2018/066892.
(Continued)

Primary Examiner — Jason K Niesz
(74) Attorney, Agent, or Firm — Grossman, Tucker, Perreault & Pfleger, PLLC

(57) ABSTRACT

A method for determining a filling stop during a filling process of an operating fluid container whose operating fluid container interior can be filled with an operating fluid via a filling pipe opening into said interior, wherein a pressure sensor for determining a pressure within the filling pipe is arranged in the filling pipe, wherein the method has the following method steps: acquiring the time profile of pressure values acquired by means of the pressure sensor; and outputting a filling stop signal in accordance with the time profile of the pressure values. In addition, the present invention discloses an operating fluid container system having an operating fluid container and a filling pipe, opening into an operating fluid container interior, for filling (Continued)

the operating fluid container with an operating fluid, wherein the operating fluid container system has a pressure sensor arranged within the filling pipe and is coupled via a data line to an electronic control device for transmitting data, representing the pressure within the filling pipe, to the electronic control device, wherein the control device is designed to carry out the method according to the invention for determining a filling stop.

14 Claims, 12 Drawing Sheets

(51) Int. Cl.
  *G05B 19/4155* (2006.01)
  *B60K 15/03* (2006.01)
(52) U.S. Cl.
  CPC ............... *B60K 2015/0323* (2013.01); *B60K 2015/049* (2013.01); *G05B 2219/45076* (2013.01)

(56) References Cited

U.S. PATENT DOCUMENTS

| | | | |
|---|---|---|---|
| 7,448,367 | B1 | 11/2008 | Reddy et al. |
| 8,770,012 | B2 | 7/2014 | Yahashi et al. |
| 9,061,581 | B2 | 6/2015 | Koukan |
| 9,434,247 | B2 | 9/2016 | Koukan et al. |
| 10,507,273 | B2 | 12/2019 | Kloeffel et al. |
| 2006/0225709 | A1 | 10/2006 | Washeleski et al. |
| 2009/0050630 | A1 | 2/2009 | Iida et al. |
| 2010/0236638 | A1 | 9/2010 | Streib |
| 2010/0276031 | A1* | 11/2010 | Saiki .................. C01B 3/00 141/1 |
| 2012/0125369 | A1 | 5/2012 | Pers et al. |

FOREIGN PATENT DOCUMENTS

| | | |
|---|---|---|
| CN | 103732434 | 4/2014 |
| DE | 202011103041 | 8/2011 |
| DE | 102010030847 | 1/2012 |
| DE | 102011056173 | 6/2013 |
| DE | 102012215635 | 3/2014 |
| EP | 2098837 | 9/2009 |
| EP | 3015838 | 5/2016 |
| GB | 2483348 | 3/2012 |
| JP | H8-127339 | 5/1996 |
| JP | 2003-281243 | 10/2003 |
| JP | 2006-293521 | 10/2006 |
| JP | 2010-236673 | 10/2010 |
| JP | 2011/092562 | 8/2011 |
| JP | 2011-157995 | 8/2011 |
| JP | 2013-200019 | 10/2013 |
| KR | 10-2013-0028777 | 3/2013 |
| WO | 91/10888 | 7/1991 |
| WO | 01/61429 | 8/2001 |
| WO | 2010/091403 | 8/2010 |
| WO | 2014/067606 | 5/2014 |
| WO | 2015/169445 | 11/2015 |

OTHER PUBLICATIONS

English translation of the International Preliminary Report on Patentability, dated Nov. 21, 2019, received in corresponding PCT Application No. PCT/EP2018/066892.
English translation of Office Action, received in related Korean Appln. No. 10-2020-7001920, dated Jan. 26, 2021.
English translation of Notice of Allowance, received in related Korean Appln. No. 10-2020-7001920, dated Jul. 14, 2021.
English translation of Office Action, received in related Japanese Appln. No. 2019-572119, dated Aug. 11, 2020.

* cited by examiner

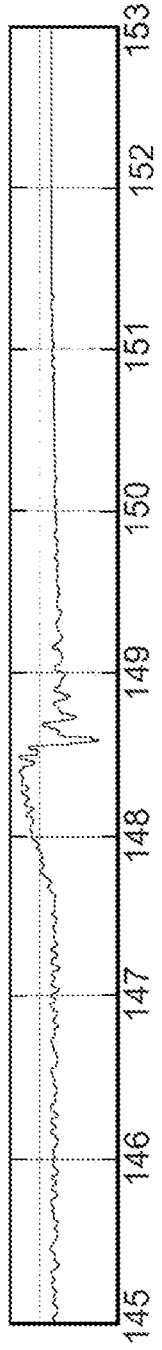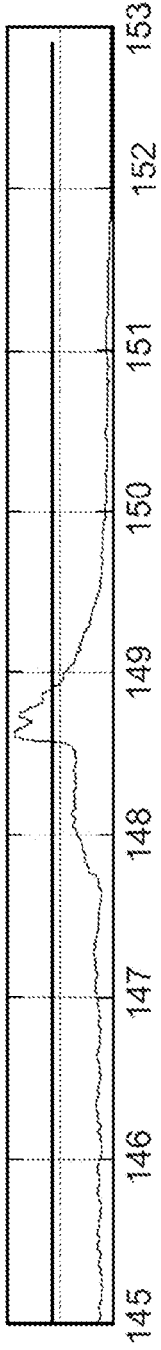

DETECTING THE DEACTIVATION OF A FILLING DEVICE

FIELD

The present invention relates to a method for detecting deactivation of a filling device during a filling process of a filling fluid container. In addition, the present invention relates to an operating fluid container system by means of which deactivation of a filling device during a filling process of an operating fluid container can be detected.

BACKGROUND

In the text which follows, reference is made to operating fluid containers which are embodied as fuel containers or as fuel tanks and to operating fluid container systems which are embodied as fuel container systems. Operating fluid containers according to the invention are, however, in particular not exclusively fuel containers (for gasolines or diesel fuels), urea containers, windscreen washer fluid containers, oil containers secondary fluid containers or additive containers, in each case for motor vehicles. Operating fluid containers of the type mentioned at the beginning are frequently manufactured by extrusion blow moulding, wherein, in particular, HDPE (High Density Polyethylene) is suitable for the manufacture of extrusion blow-moulded containers. In addition it is possible to manufacture corresponding operating fluid containers by means of an injection moulding method. Furthermore, operating fluid containers which are formed from metal can also be used.

From the prior art it is known that in order to vent a fuel container said container has at least one venting valve which in turn is fluidically connected to a venting line in order to discharge the overpressure to the atmosphere. In particular in the case of fuel containers which are designed for gasoline, their venting lines are frequently fluidically connected to activated carbon filters for passing through and filtering fuel vapours. The gases which are filtered by means of the activated carbon filter are output to the atmosphere after they pass through the activated carbon filter. When a fuel container is refuelled, the venting valve is in its open position, so that gas which is expelled from the fuel container during refuelling (fuel vapour-air mixture) can be discharged to the atmosphere—if appropriate filtered by an activated carbon filter. A filling stop or refuelling stop is initiated in such a way that the venting value is closed off by the fuel which has risen in the fuel container, as a result of which discharging of the gases/vapours which are located in the fuel container by the venting valve is prohibited. As a result of further feeding of fuel via a filling pipe opening into the fuel container interior, the pressure within the fuel container rises so that a fuel level within the filling pipe also rises until the fuel level closes off a fuel pump nozzle which is inserted into the filling pipe, subsequent to which any flowing out of fuel on the part of the fuel pump nozzle is ended.

In order to be able to carry out a refuelling process or filling process more precisely and in order to have more influence during the filling process, it is of great benefit to be able to detect deactivation of the filling device or of the filling valve.

The prior art has not disclosed any method or any operating fluid container system in which deactivation of a dispensing device, which may be embodied, for example in the form of a fuel pump nozzle, is detected. Instead, when a refuelling venting valve closes in the operating fluid container systems which are known from the prior art, it is simply assumed that the filling device ends an outputting of operating fluid with a delay after the closing of the refuelling venting valve.

SUMMARY

The present invention is based on the object of making available a method for detecting the deactivation of a filling device. In addition, the present invention is based on the object of making available an operating fluid container system which is designed to detect deactivation of a filling device during a filling process.

The objects on which the present invention is based are achieved by means of the independent claims. Advantageous refinements are described in the dependent claims.

To be more precise, the object on which the present invention is based is achieved by means of a method for determining a filling stop during a filling process of an operating fluid container, wherein an operating fluid container interior of the operating fluid container can be filled with an operating fluid via a filling pipe opening into said interior, and wherein a pressure sensor for determining a pressure within the filling pipe is arranged in the filling pipe. The method according to the invention has here a method step for acquiring the time profile of pressure valves acquired by means of the pressure sensor, and a method step for outputting a filling stop signal in accordance with the time profile of the pressure values.

By means of the method according to the invention it is possible to reliably determine a filling stop of a filling device which can be embodied, for example, as a fuel pump nozzle of a fuel pump. Therefore, by means of the method according to the invention it is possible to check the deactivation function of a fuel pump nozzle, as a result of which the safety during a filling process is increased. In addition, by means of the method according to the invention it is possible to determine the number of refuelling attempts by counting the deactivations. The number of refuelling attempts can be processed/used as an input variable in a controller. In addition, a controller can prepare a subsequent refuelling process in a targeted fashion. For example, defined refuelling of a specific quantity of fuel can be implemented. In addition, the method according to the invention provides the advantage that the refuelling processes can be specifically configured according to a customer request. For example, after the detection of a first deactivation process the number of refuelling attempts can be set. In addition, the method according to the invention can reliably permit conclusions to be drawn about a refuelling behaviour of an end user/person performing refuelling.

During a refuelling process, the operating fluid container interior is filled with operating fluid by means of a filling device which is inserted into a filling nozzle of the filling pipe. The filling device is preferably a fuel pump nozzle of a fuel pump. However, by means of the method according to the invention it is also possible to detect a filling stop if the operating fluid container is, for example, filled by means of a refilling container.

The pressure values acquired by means of the pressure sensor are preferably stored in such a way that each point in time during an acquisition time period/recording time period is assigned a pressure value. Consequently, the pressure values are preferably stored in a table. Recording or storage of the pressure values is preferably initiated as a result of a filling process being ascertained. A filling process is preferably detected by means of a sensor in the filling pipe, preferably in a filling nozzle of the filling pipe. The latter can detect, for example, insertion of a fuel pump nozzle or of some other filling device into the filling pipe.

The pressure values are preferably acquired and stored at regular time intervals.

The method is preferably embodied in such a way that a warning signal is output in accordance with the time profile of the pressure values. The warning signal is preferably an acoustic and/or optical warning signal. The warning signal can preferably be transmitted to a mobile terminal which is preferably embodied as a mobile phone. In addition, it is also possible for the warning signal to be output by, for example, a horn or some other sound-generating device of the vehicle in which the operating fluid container is installed. Furthermore, it is preferably possible that an optical warning signal is displayed by a display device of the vehicle.

The method is preferably embodied in such a way that it has the following method steps:
  acquiring at least two pressure values within a first time period within the filing pipe by means of the pressure sensor;
  acquiring at least two further pressure values within a second time period, which chronologically follows the first time period, within the filing pipe by means of the pressure sensor;
  determining a first difference between the pressure values acquired within the first time period;
  determining a second difference between the pressure values acquired within the second time period; and
  outputting a filling stop signal if the absolute value of the second difference is lower than the absolute value of the first difference.

By means of a corresponding embodiment of the method it is possible to reliably ascertain in a very simple way deactivation of a filling device with just a small number of acquired pressure values. During the first time period, the filling device outputs operating fluid so that the operating fluid container is filled with operating fluid during the first time period. The pressure values acquired by means of the pressure sensor within the filling pipe therefore arise during the first time period from the static pressure within the filling pipe and the dynamic pressure which is conditioned by the movement of the operating fluid within the filling pipe. During the second time period, the filling device does not output any operating fluid, since a deactivation mechanism (for example a breather hole) of the filling device is activated/closed by the operating fluid owing to a rising operating fluid column within the filling pipe. Consequently, during the second time period no operating fluid flows into the operating fluid container interior via the filling pipe so that the pressure sensor arranged within the filling pipe merely determines the static pressure within the filling pipe. The static pressure has a lower level of noise than the dynamic pressure so that the absolute value of the second difference during the second time period is lower than the absolute value of the first difference during the first time period.

Of course, the method can also be embodied in such a way that more than two pressure values are respectively determined within the first time period and within the second time period. In this case, the method then has the following method steps:
  acquiring a multiplicity of pressure values within a first time period within the filing pipe by means of the pressure sensor;
  acquiring a multiplicity of further pressure values within a second time period, which chronologically follows the first time period, within the filing pipe by means of the pressure sensor;
  determining a first difference between the largest pressure value acquired within the first time period and the smallest pressure value acquired within the first time period;
  determining a second difference between the largest pressure value acquired within the second time period and the smallest pressure value acquired within the second time period; and
  outputting a filling stop signal if the absolute value of the second difference is smaller than the absolute value of the first difference.

Preferably, the filling stop signal is output only if the absolute value of the second difference is smaller than half of the absolute value of the first difference. More preferably, the filling stop signal is output only if the absolute value of the second difference is smaller than a quarter of the absolute value of the first difference. More preferably, the filling stop signal is output only if the absolute value of the second difference is smaller than an eighth of the absolute value of the first difference.

The respective absolute values of the first difference and of the second difference each constitute the absolute values of the first difference or of the second difference and are therefore always positive real numbers.

More preferably, the method is embodied in such a way that it has the following method steps:
  acquiring a multiplicity of first pressure values within a first time period;
  determining a first signal-to-noise ratio on the basis of the multiplicity of first pressure values;
  acquiring a multiplicity of second pressure values within a second time period which chronologically follows the first time period;
  determining a second signal-to-noise ratio on the basis of the multiplicity of second pressure values; and
  outputting a filling stop signal if the second signal-to-noise ratio is larger than the first signal-to-noise ratio.

By means of the correspondingly embodied method it is possible to determine a filling stop of the filling device even more reliably with increased accuracy.

A multiplicity of first pressure values and second pressure values is understood to mean at least two first pressure values and two second pressure values.

The signal-to-noise ratio is defined as the ratio of the average signal power $P_{signal}$ which is present with respect to the average noise power $P_{noise}$ (the integral of the spectral noise power density over the bandwidth) which is present, wherein the origin of the noise power is not taken into account. Therefore: SNR=useful signal power/noise power=$P_{signal}/P_{noise}$.

The filling stop signal is preferably output only if the second signal-to-noise ratio is at least twice as large as the first signal-to-noise ratio. More preferably, the filling stop signal is output only if the signal-to-noise ratio is at least three times as large as the first signal-to-noise ratio. More preferably, the filling stop signal is output only if the second signal-to-noise ratio is at least four times as large as the first signal-to-noise ratio.

Instead of the signal-to-noise ratio, it is also possible to use the peak signal-to-noise ratio or the carrier-to-noise ratio to carry out the method.

The method is preferably embodied in such a way that it has the following method steps:
- acquiring a multiplicity of first pressure values within a first time period;
- acquiring a first frequency spectrum on the basis of the first pressure values;
- acquiring a multiplicity of second pressure values within a second time period which chronologically follows the first time period;
- acquiring a second frequency spectrum on the basis of the second pressure values; and
- outputting a filling stop signal if the second frequency spectrum differs from the first frequency spectrum.

Since during the first time period the pressure within the filling pipe is produced as a result of superimposition of the static pressure, which is conditioned by the operating fluid column within the filling pipe and the atmospheric pressure, and the dynamic pressure, which is conditioned by the movement of the operating fluid in the filling pipe, and in contrast the pressure within the filling pipe during the second time period is conditioned only by the static pressure, the frequency spectrum of the pressure values changes correspondingly. Therefore, by determining the frequency spectrums during the first time period and during the second time period and by comparing specific frequency ranges which are characteristic of the dynamic pressure, it is possible to draw conclusions as to whether operating fluid is flowing through the filling pipe. If, for example, frequencies which are characteristic of a flowing movement of operating fluid within the filling pipe are not present in the frequency spectrum, then the filling device can no longer output any operating fluid so that the filling stop signal is then output. The frequency spectrum in the first time period has higher frequencies than the frequency spectrum in the second time period.

The frequency spectrums are preferably generated by means of a Fourier transformation of the pressure values.

The method is preferably embodied in such a way that it has a method step for ascertaining whether the pressure values have an absolute maximum and an absolute minimum following the latter at a first time interval, and in addition a method step for outputting the filling stop signal if the first time interval is shorter than a predetermined time period.

If the filling device ends the outputting of operating fluid, this ending is preceded by closing of a venting valve which fluidically connects the operating fluid container interior to the atmosphere, so that the operating fluid container interior can no longer be vented. Consequently, owing to the rising pressure in the operating fluid container interior an operating fluid column in the filling pipe rises until a deactivation mechanism of the filling device (e.g. breather hole in a fuel pump nozzle) is activated. The level of the operating fluid column in the filler pipe is higher when the filling device (fuel pump valve) is deactivated than the level of the operating fluid in the operating fluid container. Therefore, operating fluid flows on from the filling pipe into the operating fluid container interior despite the filling valve being closed, wherein the pressure in the operating fluid container interior rises further. The pressurized gas within the operating fluid container acts as a spring and drives the operating fluid out of the operating fluid container interior back into the filling pipe. This gives rise to a damped oscillating movement of the operating fluid between the operating fluid container interior and the filling pipe, which in turn gives rise to pressure fluctuations within the filling pipe. The absolute maximum corresponds here to the pressure which is acquired by the pressure sensor, directly when the filling device is deactivated, since at this time the level of the operating fluid in the filling pipe is at a maximum. The absolute maximum corresponds to the pressure value acquired by the pressure sensor when the operating fluid is first forced back into the filling pipe owing to the overpressure prevailing in the operating fluid container interior.

The absolute minimum is particularly pronounced if the filling pipe is fluidically connected to the operating fluid container interior via a non-return valve.

The absolute maximum, which can also be referred to as an absolute maximum pressure value, is to be understood here as being such that it has to be greater than the pressure values which the pressure sensor outputs as static noise. The absolute minimum, which can also be referred to as the absolute minimum pressure value, is to be understood here as being such that it has to be smaller than the pressure values which the pressure sensor outputs as static noise.

The first time period preferably comprises 1 second. More preferably, the first time period comprises 0.5 seconds. More preferably, the first time period comprises 0.4 seconds. More preferably, the first time period comprises 0.3 seconds. More preferably, the first time period comprises 0.2 seconds. More preferably, the first time period comprises 0.1 seconds. More preferably the first time period comprises less than 0.1 seconds.

The pressure values are preferably acquired starting with a filling process and recorded. A start of a filling process can be indicated, for example, by opening of a fuel tank flap and/or by means of a sensor in the filling pipe which detects insertion of a filling device into the filling pipe. More preferably, the pressure values are recorded starting from the discharging of an excess pressure in the operating fluid container. This is particularly advantageous in PHEV vehicles.

The method is preferably embodied in such a way that the method has a method step for carrying out high-pass filtering of the pressure values acquired by the pressure sensor, wherein the method step of outputting the filling stop signal is executed if the high-pass-filtered pressure values undershoot a predetermined lower threshold.

By virtue of high-pass filtering of the pressure values, the low-frequency signal components of the pressure values, which are conditioned, in particular, by the slow rise in pressure owing to the rising level in the filling pipe, are filtered out, so that the rapid change in pressure which is conditioned by the oscillating movement of the operating fluid in the filling pipe can be more easily identified.

The high-pass filtering preferably lets through only signals which have a higher frequency than 1 Hz. More preferably, the high-pass filtering lets through only signals which have a higher frequency than 2 Hz. More preferably, the high-pass filtering lets through only signals which have a higher frequency than 4 Hz. More preferably, the high-pass filtering lets through only signals which have a higher frequency than 8 Hz. More preferably, the high-pass filtering lets through only signals which have a higher frequency than 16 Hz. More preferably, the high-pass filtering lets through only signals which have a higher frequency than 32 Hz.

The method is preferably embodied in such a way that the method has a method step for carrying out high-pass filtering of the pressure values acquired by the pressure sensor, and a subsequent method step for acquiring the absolute values of the high-pass-filtered pressure values, wherein the method step for outputting the filling stop signal is executed if the high-pass-filtered pressure values which have been converted into absolute values exceed a predetermined upper threshold.

The correspondingly embodied method has the advantage that oscillation of an operating fluid in the filling pipe and therefore a filling stop, preceding this oscillating movement, of a filling device can be determined with a level of reliability which is improved even further.

The method is preferably embodied in such a way that the method has a method step for carrying out high-pass filtering of the pressure values acquired by the pressure sensor, a subsequent method step for acquiring the absolute values of the high-pass-filtered pressure values and a method step for carrying out low-pass filtering of the pressure values which were firstly high-pass filtered and then converted into absolute values, wherein the method step for outputting the filling stop signal is executed if the pressure values which were firstly high-pass filtered and then converted into absolute values and subsequently low-pass filtered exceed a predetermined upper threshold.

The correspondingly embodied method has the advantage that oscillation of an operating fluid in the filling pipe and therefore a filling stop, which precedes this oscillating movement, of a filling device can be determined with a level of reliability which is improved even further, since high-frequency components of the signals (pressure values) which are converted in this way are filtered out.

The low-pass filtering preferably filters out signals which have a higher frequency than 1 Hz. More preferably, the low-pass filtering filters out signals which have a higher frequency than 2 Hz. More preferably, the low-pass filtering filters out signals which have a higher frequency than 4 Hz. More preferably, the low-pass filtering filters out signals which have a higher frequency than 8 Hz. More preferably, the low-pass filtering filters out signals which have a higher frequency than 16 Hz. More preferably, the low-pass filtering filters out signals which have a higher frequency than 32 Hz.

The object on which the present invention is based is also achieved by an operating fluid container system having an operating fluid container and a filling pipe, opening into an operating fluid container interior of the operating fluid container, for filling the operating fluid container with an operating fluid, wherein the operating fluid container system is characterized in that it has at least one pressure sensor arranged within the filling pipe and is coupled via a data line to an electronic control device for transmitting data, representing the pressure within the filling pipe, to the electronic control device, wherein the control device is designed to carry out a method as described above for determining a filling stop.

The coupling of the pressure sensor to the electronic control device can be carried out via a wire-bound data line and/or via a wireless data line.

The pressure sensor is preferably installed within the filling pipe in such a way that the pressure sensor does not project beyond an inner face of the filling pipe.

When the operating fluid container system is correspondingly embodied, making the pressure sensor available within the filling pipe means that no additional eddying is produced by the pressure sensor. On the one hand, as a result the measuring accuracy of the pressure within the filling pipe is increased, and on the other hand an increased filling volume flow through the filling pipe can also be achieved.

More preferably, the pressure sensor is installed within the filling pipe in such a way that the pressure sensor is flush with the inner face of the filling pipe.

The object on which the present invention is based is also achieved by means of a method for determining a filling stop during a filling process of an operating fluid container, wherein an operating fluid container interior of the operating fluid container can be filled via a filling pipe, opening into said interior, with an operating fluid, wherein the operating fluid container system has an acceleration sensor which is mounted on the operating fluid container or on the filling pipe. The method according to the invention has here a method step for acquiring the time profile of acceleration values acquired by means of the acceleration sensor, and a method step for outputting a filling stop signal in accordance with the time profile of the acceleration values.

The acceleration values which are acquired by means of the acceleration sensor are preferably stored in such a way that each point in time during an acquisition time period/recording time period is assigned an acceleration value. Consequently, the acceleration values are preferably stored in a table. Recording or storage of the acceleration values is preferably initiated by a filling process being ascertained. A filling process is preferably detected by a sensor in the filling pipe, preferably in a filling nozzle of the filling pipe. Said sensor can detect, for example, insertion of a fuel pump nozzle or of some other filling device into the filling pipe.

The acceleration values are preferably acquired and stored at regular time intervals.

The acceleration sensor can also be referred to as a solid-borne sound sensor. The acceleration sensor is preferably connected to the filling pipe. In addition, owing to the connection of the filling pipe to the operating fluid container and the resulting good transmission of solid-borne sound from the filling pipe to the operating fluid container it is possible for the acceleration sensor to be connected to the operating fluid container.

The method is preferably embodied in such a way that the filling stop signal is output if an acceleration value exceeds a predetermined acceleration limiting value.

The object on which the present invention is based is also achieved by means of an operating fluid container system having an operating fluid container and a filling pipe, opening into an operating fluid container interior of the operating fluid container, for filling the operating fluid container with an operating fluid, wherein the operating fluid container system is characterized in that it has an acceleration sensor which is mounted on the operating fluid container or on the filling pipe, wherein the acceleration sensor is coupled via a data line to an electronic control device for transmitting acceleration data to the electronic control device, and wherein the control device is designed to carry out a method for determining a filling stop according to one of the two methods last described above.

The coupling of the acceleration sensor to the electronic control device can be carried out via a wire-bound data line and/or via a wireless data line.

The acceleration sensor can also be referred to as a solid-borne sound sensor. The acceleration sensor is preferably connected to the filling pipe. In addition, owing to the connection of the filling pipe to the operating fluid container and the resulting good transmission of solid-borne sound from the filling pipe to the operating fluid container it is possible for the acceleration sensor to be connected to the operating fluid container.

The object on which the present invention is based is also achieved by means of a method for determining a filling stop during a filling process of an operating fluid container, wherein an operating fluid container interior of the operating fluid container can be filled via a filling pipe, opening into said interior, with an operating fluid, wherein a volume flow sensor for determining a volume flow within the filling pipe is arranged in the filling pipe. The method according to the invention has here a method step for acquiring the time profile of volume flow values acquired by means of the volume flow sensor, and a method step for outputting a filling stop signal in accordance with the time profile of the volume flow values.

The volume flow values which are acquired by means of the volume flow sensor are preferably stored in such a way that each point in time during an acquisition time period/recording time period is assigned a volume flow value. Consequently, the volume flow values are preferably stored in a table. Recording or storage of the volume flow values is preferably initiated by a filling process being ascertained. Preferably, a filling process is detected by means of a sensor in the filling pipe, preferably in a filler nozzle of the filling pipe. Said sensor can detect, for example, insertion of a fuel pump nozzle or some other filling device into the filling pipe.

The volume flow values are preferably acquired and stored at regular time intervals.

The method is preferably embodied in such a way that the filling stop signal is output if a volume flow value undershoots a predetermined volume flow limiting value.

The object on which the present invention is based is also achieved by means of an operating fluid container system having an operating fluid container and a filling pipe, opening into an operating fluid container interior of the operating fluid container, for filling the operating fluid container with an operating fluid, wherein the operating fluid container system is characterized in that it has a volume flow sensor arranged within the filling pipe and is coupled via a data line to an electronic control device for transmitting data, representing the volume flow within the filling pipe, to the electronic control device, and wherein the control device is designed to carry out a method for determining a filling stop according to one of the two methods last described above.

The coupling of the volume flow sensor to the electronic control device can be carried out via a wire-bound data line and/or via a wireless data line.

The operating fluid container system is preferably embodied in such a way that it has a non-return valve via which the operating fluid container interior is fluidically connected to the filling pipe (20).

The non-return valve is preferably arranged as a flap between the end of the insertion pipe opening into the operating fluid container interior, and the operating fluid container interior.

Making available the non-return valve means that when a filling process ends the underpressure which is generated in the filling pipe is amplified owing to the oscillating movement of the operating fluid in the filling pipe, so that a filling stop of the filling device can be determined even more reliably.

If the operating fluid container system has a pressure sensor within the filling pipe, the pressure sensor is then preferably arranged upstream of the non-return valve. Upstream refers here to the direction of flow of the operating fluid which is filled into the operating fluid container interior via the filling pipe.

BRIEF DESCRIPTION OF THE DRAWINGS

Further advantages, details and features of the invention which arise from the explained exemplary embodiments can be found below. Here, in particular:

FIG. 7A shows an illustration of the time profile of pressure values, acquired by means of the pressure sensor illustrated in FIG. 1, within a filling pipe of the operating fluid container system during a filling process of the operating fluid container;

FIG. 7B shows an illustration of the time profile of the pressure values illustrated in FIG. 7A, after said values have been filtered by a high-pass filter;

FIG. 7C shows an illustration of the time profile of the absolute values of the pressure signals illustrated in FIG. 7B;

FIG. 7D shows an illustration of the time profile of the pressure signals illustrated in FIG. 7C, after they have been filtered by a low-pass filter;

DETAILED DESCRIPTION

In the description which now follows, identical reference symbols denote identical components or identical features, so that a description of a component which is made with reference to one figure also applies to the other figures, so that repetition of the description is avoided. In addition, individual features which have been described with respect to one embodiment can also be applied separately in other embodiments.

Figure 1:
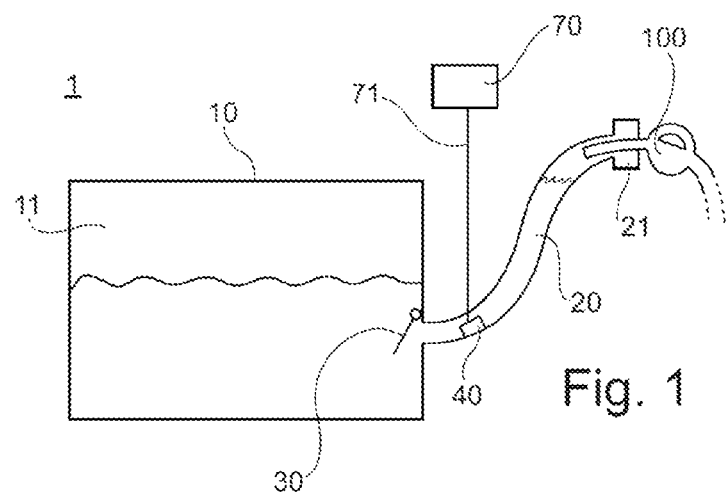
FIG. 1 shows a schematic illustration of an operating fluid container system according to the invention.

FIG. 1 shows a schematic illustration of an operating fluid container system 1 according to the invention, which operating container system 1 is embodied in the present case as a fuel container system 1. The operating fluid container system 1 has an operating fluid container 10 and a filling pipe 20, opening into an operating fluid container interior 11 of the operating fluid container 10 for filling the operating fluid container interior 10 with an operating fluid. From FIG. 1 it is also apparent that the operating fluid container system 1 also has a pressure sensor 40 arranged within the filling pipe 20. It is clear that the pressure sensor is arranged in a junction region in which the filling pipe 20 opens into the operating fluid container interior 11. In this context, in the installation position of the operating fluid container system 1 the pressure sensor 40 is arranged on a lower wall of the filling pipe 20.

Although it is not apparent from FIG. 1, the pressure sensor 40 is preferably installed within the filling pipe 20 in such a way that the pressure sensor 40 does not project beyond and inner face of the filling pipe 20. When the operating fluid container system 1 is embodied correspondingly, making available the pressure sensor 40 within the filling pipe 20 means that no additional eddies are produced by the pressure sensor 40. On the one hand, this increases the measuring accuracy of the pressure sensor 40 within the filling pipe 20 and, on the other hand, an increased filled volume flow can continue to be achieved by the filling pipe 20.

The operating fluid container interior 11 can be filled with an operating fluid via a filling device 100 which is embodied as a fuel pump nozzle 100 in the illustrated exemplary embodiment. The fuel pump nozzle 100 is for this purpose introduced into the filling pipe 20 by means of a filling nozzle 21 of the filling pipe 20.

In the junction region of the filling pipe 20 into the operating fluid container interior 11, a non-return valve 30 is arranged which is embodied as a non-return valve 30 in the present case. The non-return valve 30, which can also be referred to as an inlet check valve 30, prevents or reduces at least flowing back of operating fluid from the operating fluid container interior 11 into the filling pipe 20.

From FIG. 1 it is also apparent that the pressure sensor 40 is coupled via a data line 71 to an electronic control device 70 for transmitting data, representing the pressure within the filling pipe 20, to the electronic control device 70. The data line 71 can be embodied as a wire-bound data line 71 or as a wireless data line 71.

The control device 70 is designed to carry out one of the methods described below for determining a filling stop.

Figure 2:
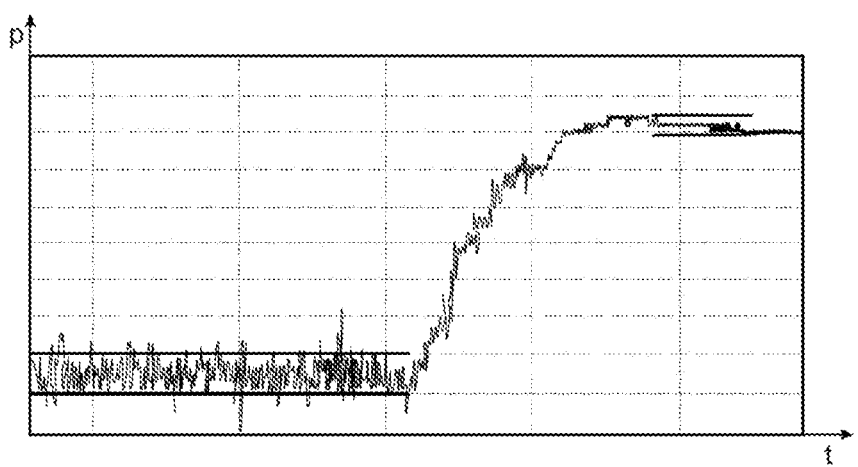
FIG. 2 shows an illustration of pressure values, acquired by means of the pressure sensor illustrated in FIG. 1, within a filling pipe of the operating fluid container system during a filling process of the operating fluid container.

FIG. 2 shows an illustration of pressure values, acquired by means of the pressure sensor 40 illustrated in FIG. 1, within the filling pipe 20 of the operating fluid container system 1 during a filling process of the operating fluid container 10. It is apparent that in a first time period the pressure within the filling pipe 20 is essentially constant, but has a high noise level. During the first time period, the operating fluid container interior 11 is fluidically connected via a venting valve (not illustrated in the figures) to the atmosphere in order to discharge gases expelled from the operating fluid container interior. During the first time period the pressure in the filling pipe 20 results from a static pressure component which is caused by the operating fluid column in the filling pipe 20 and the atmospheric pressure, and a dynamic pressure component which is caused by the flowing movement of the operating fluid in the filling pipe 20.

After a deactivation filling level in the operating fluid container interior 11 is reached, the venting valve closes so that the operating fluid container interior 11 is fluidically disconnected from the atmosphere. Consequently, further inputting of operating fluid causes the pressure within the operating fluid container interior 11 to rise, as a result of which a level of the operating fluid in the filling pipe 20 rises. This is apparent from the rising pressure values in FIG. 2. If the operating fluid reaches the fluid pump nozzle 100, the fluid pump nozzle executes a filling stop. Owing to this, no operating fluid or considerably less operating fluid flows from the filling pipe 20 into the operating fluid container interior 11 during a second time period, so that the pressure which is determined by the pressure sensor 40 during the second time period has a significantly lower noise level owing to the absence of the dynamic pressure component. This is apparent from the pressure profile illustrated in FIG. 2, in the right-hand part of FIG. 2. It is apparent that the noise level is higher during the first time period than during the second time period.

Figure 3:
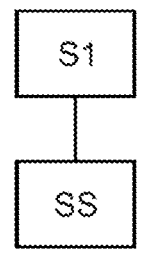
FIGS. 3 to 6 show flowchart diagrams of methods for determining a filling stop according to different embodiments of the present invention.

FIG. 3 shows a method sequence which the electronic control device 70 executes. In a first method step S1, the time profile of pressure values acquired by means of the pressure sensor 40 is recorded. Subsequently, the control device 70 outputs a filling stop signal SS in accordance with the time profile of the pressure values.

Figure 4:
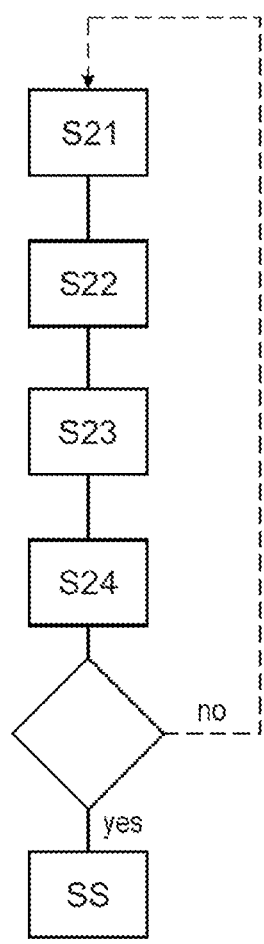

According to one embodiment of the present invention, the control device 70 is designed to execute the method illustrated in FIG. 4. In a method step S21, at least two pressure values are acquired within the filling pipe 20 by means of the pressure sensor 40 within a first time period. The first time period is here the time period in FIG. 2 in which the pressure values are obtained from the superimposition of the static pressure and of the dynamic pressure within the filling pipe 20. Subsequently, a method step S22 for determining at least two further pressure values within a second time period which chronologically follows the first time period, within the filling pipe 20 by means of the pressure sensor 40 is carried out. The second time period is here the time period in FIG. 2 in which the pressure values are produced exclusively from static pressure within the filling pipe 20, and consequently no operating fluid flows from the filling pipe 20 into the operating fluid container interior 11. Subsequently, a method step S23 for determining a first difference between the pressure values acquired within the first time period and a method step S24 for determining a second difference between the pressure values acquired within the second time period are executed. In a further method step, the absolute values of the first difference and of the second difference are compared with one another, and if the absolute value of the second difference is smaller than the absolute value of the first difference, the method step SS for outputting the filling stop signal is output. Alternatively, if the absolute value of the second difference is not smaller than the absolute value of the first difference, the procedure jumps back to method step S21.

The control device 70 is preferably designed in such a way that more than two pressure values are respectively acquired within the first time period and within the second time period. In this case, the method then has the following method steps:

acquiring S21 a multiplicity of pressure values within a first time period within the filling pipe 20 by means of the pressure sensor 40;

acquiring S22 a multiplicity of further pressure values within a second time period, which chronologically follows the first time period, within the filling pipe 20 by means of the pressure sensor 40;

determining S23 a first difference between the largest pressure value acquired within the first time period and the smallest pressure value acquired within the first time period;

determining S23 a second difference between the largest pressure value acquired within the second time period and the smallest pressure value acquired within the second time period; and outputting SS a filling stop signal if the absolute value of the second difference is smaller than the absolute value of the first difference.

Figure 5:
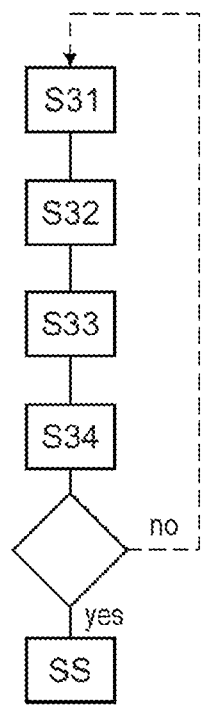

According to a further embodiment of the present invention, the control device 70 is designed to execute the method illustrated in FIG. 5. In a method step S31, a multiplicity of first pressure values are acquired within the first time period. Subsequently, in a method step S32 a first signal-to-noise ratio is acquired on the basis of the multiplicity of first pressure values. The method also has a method step S33 for acquiring a multiplicity of second pressure values within the second time period, which chronologically follows the first time period, and a chronologically following method step S34 for determining a second signal-to-noise ratio on the basis of the multiplicity of second pressure values. In a further method step, the first signal-to-noise ratio and the second signal-to-noise ratio are compared with one another, and if the second signal-to-noise ratio is larger than the first signal-to-noise ratio, the method step SS for outputting the filling stop signal is executed. Alternatively, if the second signal-to-noise ratio is not larger than or is equal to the first signal-to-noise ratio, the procedure jumps back to method step S31.

Figure 6:
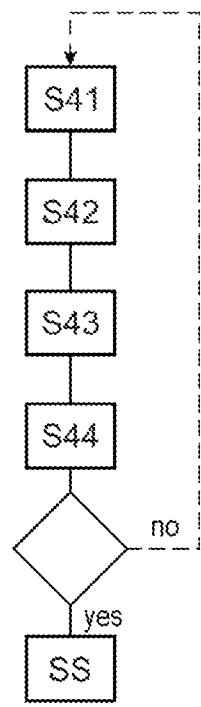

According to a further embodiment of the present invention, the control device 70 is designed to execute the method illustrated in FIG. 6. In a method step S41, a multiplicity of first pressure values are acquired within a first time period. Subsequently, in a method step S42 a first frequency spectrum is acquired or calculated on the basis of the first pressure values. The first frequency spectrum is preferably generated by means of a Fourier transformation of the first pressure values. The method also has a method step S43 for acquiring a multiplicity of second pressure values within a second time period which chronologically follows the first time period. Subsequently, in a method step S44 a second frequency spectrum is acquired or calculated on the basis of the second pressure values. The second frequency spectrum is preferably generated by means of a Fourier transformation of the second pressure values. In a further method step, the first frequency spectrum and the second frequency spectrum are compared with one another, and if the second frequency spectrum differs from the first frequency spectrum the method step SS for outputting the filling stop signal is executed. Alternatively, if the second frequency spectrum does not differ from the first frequency spectrum, the procedure jumps back to method step S41.

By determining the frequency spectrums during the first time period and during the second time period and by comparing specific frequency ranges which are characteristic of the dynamic pressure, it is possible to draw conclusions as to whether operating fluid is flowing through the filling pipe 20. If, for example, frequencies which are characteristic of a flowing movement of operating fluid within the filling pipe 20 are not present in the frequency spectrum, the filling device 100 no longer outputs any operating fluid so that the filling stop signal is then output. The frequency spectrum in the first time period has higher frequencies than the frequency spectrum in the second time period.

FIG. 7A shows an illustration of the time profile of pressure values, acquired by means of the pressure sensor 40 illustrated in FIG. 1, within the filling pipe 20 of the operating fluid container system 1 during a filling process of the operating fluid container 10. It is apparent that in the time range between 147 seconds and 149 seconds the pressure within the filling pipe 20 firstly rises, before then dropping severely at approximately 148.5 seconds.

When the filling device 100 ends the outputting of operating fluid, this ending is then preceded by the closing of a venting valve which fluidically connects the operating fluid container interior 11 to the atmosphere and is not illustrated in the figures, so that the operating fluid container interior 11 can no longer be vented. Consequently, owing to the rising pressure in the operating fluid container interior 11 an operating fluid column rises in the filling pipe 20 until a deactivation mechanism of the filling device 100 is activated. The level of the operating fluid column in the filling pipe 20 is higher when the filling device 100 or the fuel pump nozzle 100 is deactivated than the level of the operating fluid in the operating fluid container 10. Therefore, despite the venting valve being closed, operating fluid flows on from the filling pipe 20 into the operating fluid container interior 11, wherein the pressure in the operating fluid container interior 11 rises further. The pressurized gas within the operating fluid container interior 11 acts as a spring and drives the operating fluid out of the operating fluid container interior 11 back into the filling pipe 20. This gives rise to a damped oscillating movement of the operating fluid between the operating fluid container interior 11 and the filling pipe 20, which in turn gives rise to pressure fluctuations and to a drop in pressure within the filling pipe 20.

Figure 8:
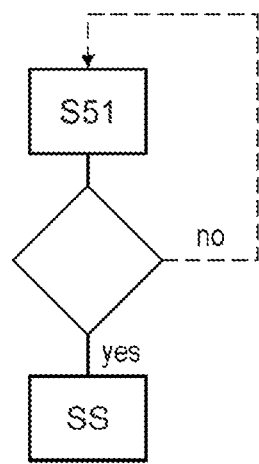
FIGS. 8 to 11 show flowchart diagrams of methods for determining a filling stop according to different embodiments of the present invention.

According to a further embodiment of the present invention, the control device 70 is designed to execute the method illustrated in FIG. 8. In a method step S51 it is determined whether the pressure values acquired by the pressure sensor 40 in the filling pipe 20 have an absolute maximum and an absolute minimum which follows the latter at a first time interval. Subsequently, the method step SS for outputting the filling stop signal is executed if the first time interval is shorter than a predetermined time period. During the configuration of the operating fluid container system 1, the dimensions and the geometries of the operating fluid container 10, of the filling pipe 20 and of the non-return valve 30 are such that the absolute minimum pressure follows approximately 0.1 seconds after the absolute maximum pressure value. Consequently, when the operating fluid container system 1 is configured correspondingly, the predetermined time period is preferably between 0.5 seconds and 0.2 seconds. The predetermined time period can be selected differently in accordance with the dimensions and geometries of the operating fluid container 10, of the filling pipe 20 and of the non-return valve 30.

The absolute maximum corresponds here to the pressure acquired by the pressure sensor 20, directly when the filling device 100 is deactivated, since at this time the level of the operating fluid in the filling pipe 20 is at a maximum. The absolute minimum corresponds to the pressure value acquired by the pressure sensor 20 when the operating fluid is first forced back into the filling pipe 20 owing to the overpressure prevailing in the operating fluid container interior 11. The absolute minimum is particularly pronounced if the filling pipe 20 is fluidically connected to the operating fluid container interior 11 via a non-return valve 30.

The absolute maximum, which can also be referred to as the absolute maximum pressure value, is to be understood here as meaning that it has to be larger than the pressure values which the pressure sensor 20 outputs as static noise. The absolute minimum, which can also be referred to as the absolute minimum pressure value, is to be understood here as meaning that it has to be smaller than the pressure values which the pressure sensor 20 outputs as static noise.

FIG. 7B shows an illustration of the time profile of the pressure values illustrated in FIG. 7A after they have been filtered by a high-pass filter.

Figure 9:
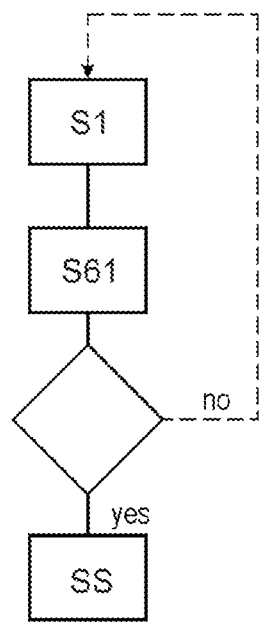

According to a further embodiment of the present invention, the control device 70 is designed to execute the method illustrated in FIG. 9. In the method step S1, the time profile of pressure values acquired by means of the pressure sensor 40 is recorded. In a method step S61, the pressure values acquired by the pressure sensor 20 are subjected to high-pass filtering. Subsequently, it is checked by means of the control device 70 whether the filtered pressure values undershoot a predetermined lower threshold. If the high-pass-filtered pressure values undershoot the predetermined lower threshold, the method step SS for outputting the filling stop signal is executed. If the high-pass-filtered pressure values do not undershoot the predetermined lower threshold, the procedure can alternatively jump back to method step S1.

FIG. 7C shows an illustration of the time profile of the absolute values of the pressure signals illustrated in FIG. 7B.

Figure 10:
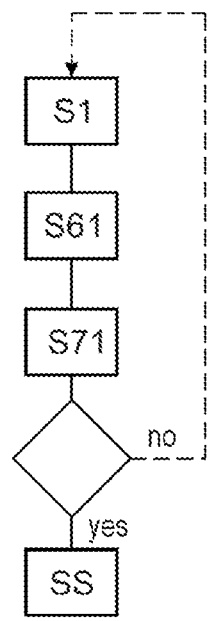

According to a further embodiment of the present invention, the control device 70 is designed to execute the method illustrated in FIG. 10. In method step S1, the time profile of pressure values acquired by means of the pressure sensor 40 is recorded. In a method step S61, the pressure values acquired by the pressure sensor 20 are subjected to high-pass filtering. Subsequently, in a method step S71 the absolute values of the high-pass-filtered pressure values/pressure signals are acquired/generated. Subsequently, it is checked by means of the control device 70 whether the high-pass-filtered pressure values which have been converted into absolute values exceed a predetermined upper threshold. If the high-pass-filtered pressure values which have been converted into absolute values exceed the predetermined upper threshold, the method step SS for outputting the filling stop signal is executed. If the high-pass-filtered pressure values which are converted into absolute values do not exceed the predetermined upper threshold, the procedure can alternatively jump back to method step S1.

FIG. 7D shows an illustration of the time profile of the pressure signals illustrated in FIG. 7C after they have been filtered by a low-pass filter.

Figure 11:
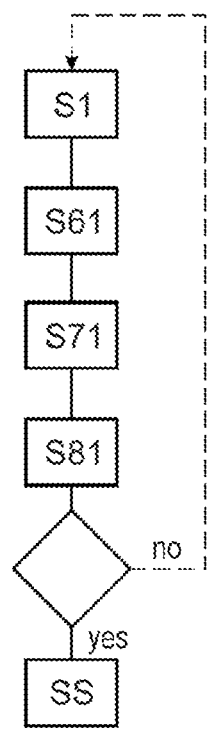

According to a further embodiment of the present invention, the control device 70 is designed to carry out the method illustrated in FIG. 11. In the method step S1, the time profile of pressure values acquired by means of the pressure sensor 40 is recorded. In a method step S61, the pressure values acquired by the pressure sensor 20 are subjected to high-pass filtering. Subsequently, in a method step S71 the absolute values of the high-pass-filtered pressure values/pressure signals are acquired/generated. In a method step S81, the high-pass-filtered pressure values/pressure signals which have been converted into absolute values are subjected to low-pass filtering. Subsequently, it is checked by means of the control device 70 whether the pressure values/pressure signals which have been firstly high-pass filtered and then converted into absolute values and subsequently low-pass filtered exceed a predetermined upper threshold. If the high-pass-filtered pressure values/pressure signals which have been converted into absolute values and subsequently low-pass filtered exceed the predetermined upper threshold, the method step SS for outputting the filling stop signal is executed. If the high-pass-filtered pressure values/pressure signals which have been converted into absolute values and subsequently low-pass filtered do not exceed the predetermined upper threshold, the procedure can alternatively jump back to method step S1.

Figure 12:
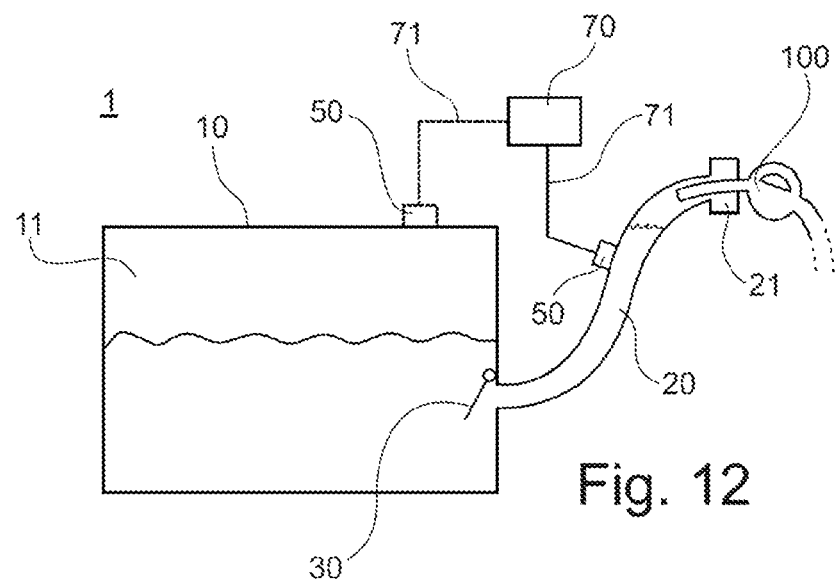
FIG. 12 shows a schematic illustration of an operating fluid container system according to a further embodiment of the present invention.

FIG. 12 shows a schematic illustration of an operating fluid container system 1 according to a further embodiment of the present invention. The operating fluid container system 1 illustrated in FIG. 12 differs from the operating fluid container system 1 illustrated in FIG. 1 in that it has at least one acceleration sensor 50 which can be arranged on the filling pipe 20 or on the operating fluid container 10. The operating fluid container system 1 can also have two acceleration sensors 50, wherein a first acceleration sensor 50 is arranged on the filling pipe 20, and a second acceleration sensor 50 is arranged on the operating fluid container 10. The acceleration sensor 50 is coupled via a wire-bound data line 71 or wireless data line 71 to the control device 70 in order to transmit data. In addition, it is also possible for the operating fluid container system 1 which is illustrated in FIG. 12 to have the pressure sensor 40 illustrated in FIG. 1.

Figure 13:
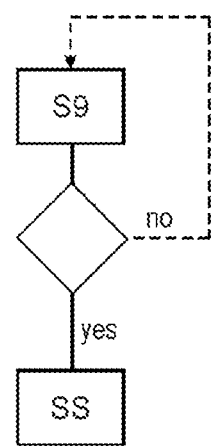
FIG. 13 shows a flowchart diagram of a method for determining a filling stop in the operating fluid container system shown in FIG. 12.

The control device 70 is designed to execute the method illustrated in FIG. 13. In a method step S9, the time profile of acceleration values acquired by means of the acceleration sensor 50 is acquired. Subsequently, the control device 70 checks whether an acceleration value exceeds a predetermined acceleration limiting value. If an acceleration value exceeds the acceleration limiting value, the method step SS for outputting the filling stop signal is executed. Consequently, the filling stop signal is output in accordance with the time profile of the acceleration values acquired by the acceleration sensor 50.

Figure 14:
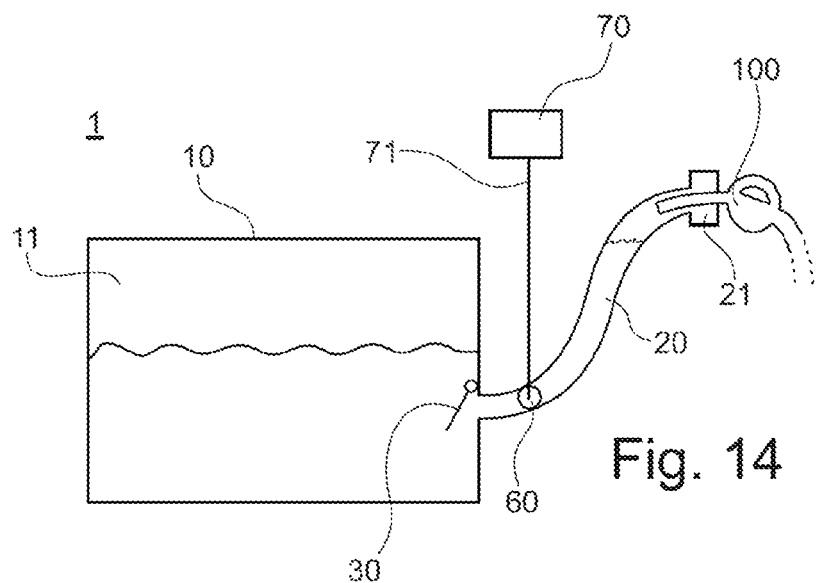
FIG. 14 shows a schematic illustration of an operating fluid container system according to a further embodiment of the present invention.

FIG. 14 shows a schematic illustration of an operating fluid container system 1 according to a further embodiment of the present invention. The operating fluid container system 1 which is illustrated in FIG. 14 differs from the operating fluid container system 1 which is illustrated in FIG. 1 in that this operating fluid container system 1 has at least one volume flow sensor 60 arranged in the filling pipe 20 for determining volume flow measured values of the operating fluid through the filling pipe 20. The volume flow sensor 60 is coupled via a wire-bound data line 71 or wireless data line 71 to the control device 70 for the transmission of data. In addition, it is also possible for the operating fluid container system 1 which is illustrated in FIG. 14 to have the pressure sensor 40 illustrated in FIG. 1 and/or the acceleration sensor 50 illustrated in FIG. 12.

Figure 15:
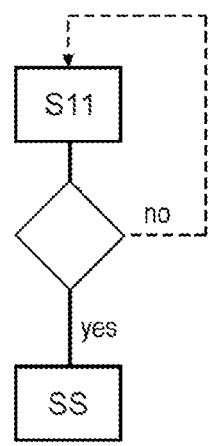
FIG. 15 shows a flowchart diagram of a method for determining a filling stop in the operating fluid container system shown in FIG. 14.

The control device 70 is designed to execute the method illustrated in FIG. 15. In one method step S11, the time profile of volume flow values acquired by means of the volume flow sensor 60 is acquired. Subsequently, the control device 70 checks whether a volume flow value undershoots a predetermined value flow limiting value. If a volume flow value undershoots the volume flow limiting value, the method step SS for outputting the filling stop signal is executed. Consequently, the filling stop signal is output in accordance with the time profile of the volume flow values acquired by the volume flow sensor 60.

A method for achieving a target volume or for making available a defined top-up quantity is described below with reference to FIGS. 16 to 19. The determination of the volume flow or of the filling volume flow is to be carried out by means of the pressure sensor 40 arranged in the filling pipe 20.

Figure 16:
FIG. 16 shows an illustration of the time profile of the pressure in the operating fluid container (respective lower pressure profiles) and of the pressure in the filling pipe (respective upper pressure profiles)

In FIG. 16, the profile of the pressure in the operating fluid container 10 and the pressure in the filling pipe 20 is illustrated at various filling rates (10 l/min to 50 l/min).

It is apparent here that the pressure profile differs fundamentally. In particular, in the case of the pressure measurement in the filling pipe 20 an influence of the filling level on the pressure can be seen. Since the pressure sensor in the filling pipe is fluidically connected to the tank/operating fluid container, said pressure sensor additionally measures the hydrostatic pressure of the fuel/of the operating fluid in the tank. This is apparent from a pressure in the filling pipe 20 which rises with the filling level. As soon as the fuel level in the main chamber (this is a saddle tank) doe not rise any further, because the entire fuel flow is passing into the secondary chamber, there is also no further rise in pressure.

Figure 17:
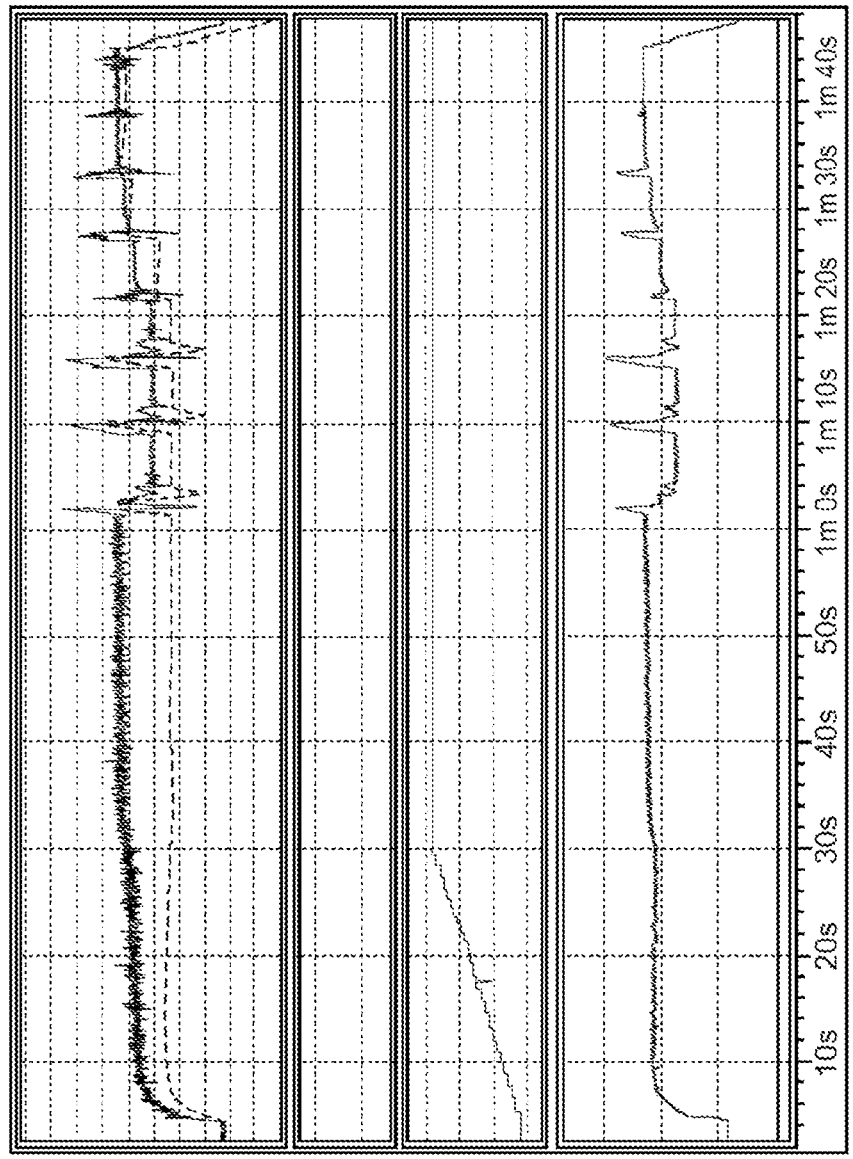
FIG. 17 shows illustrations of time pressure profiles, wherein in the upper diagram the pressure profile in the filling pipe is illustrated with a continuous line and the pressure profile in the container is illustrated with a dashed line, wherein in the middle diagram the hydrostatic pressure in the filling pipe is illustrated, and wherein in the lower diagram the time pressure profile in the filling pipe compensated by the hydrostatic component is illustrated.

Therefore, in FIG. 17 the pressure profile is illustrated compensated by the hydrostatic component. The filling level of the main chamber is converted into a hydrostatic pressure (signal hydrostaticpressure) by means of $p_{hydrostatic}=\rho gh$. The compensated pressure profile (signal tankpressureadjusted) is produced from the difference between the pressure in the filling pipe and the hydrostatic pressure.

Figure 18:
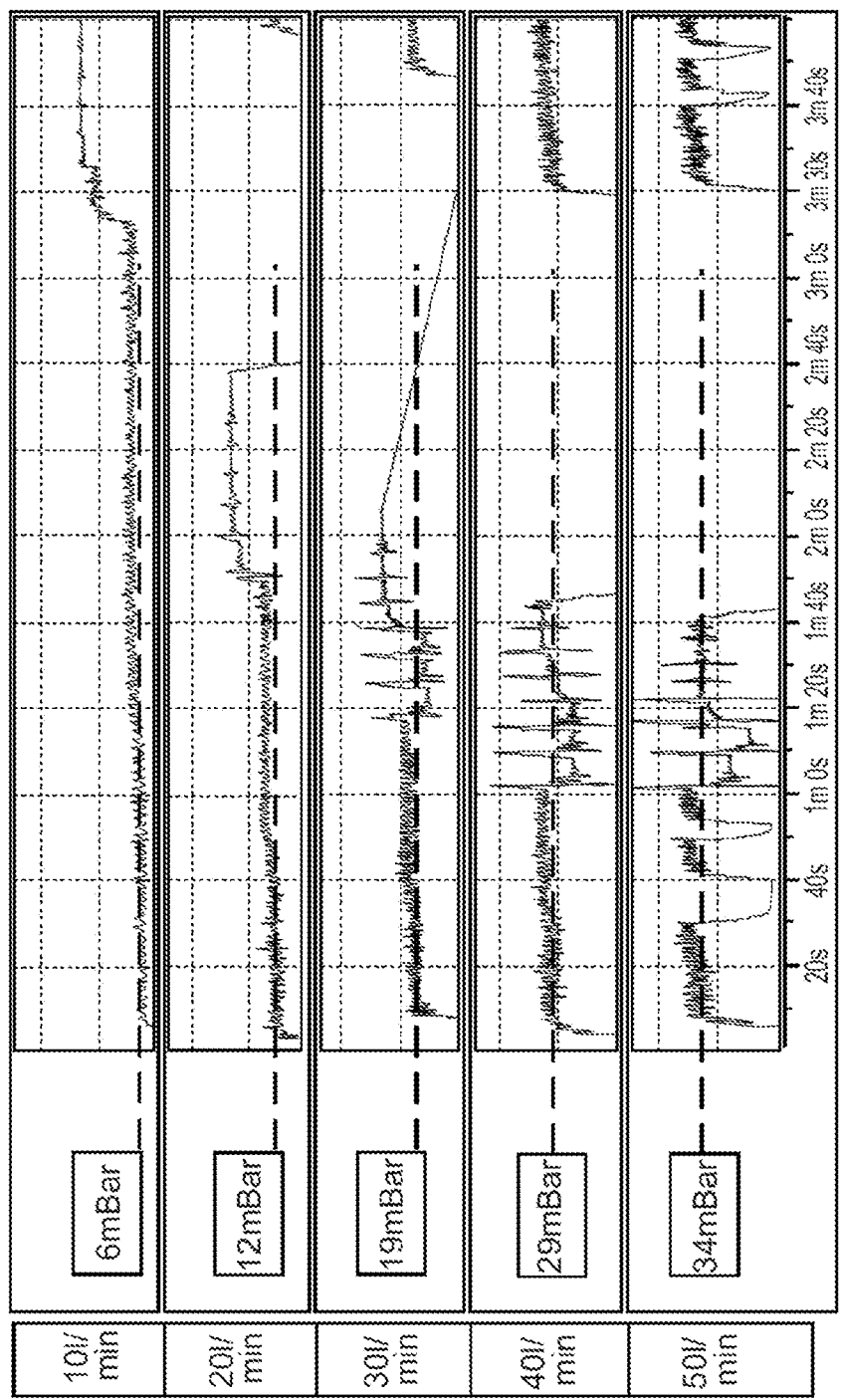
FIG. 18 shows illustrations of time pressure profiles in the filling pipe for different filling volume flows.

A pressure level which is relatively constant over the refuelling process can therefore be acquired. This pressure level changes with the volume flow, as shown in FIG. 18.

Figure 19:
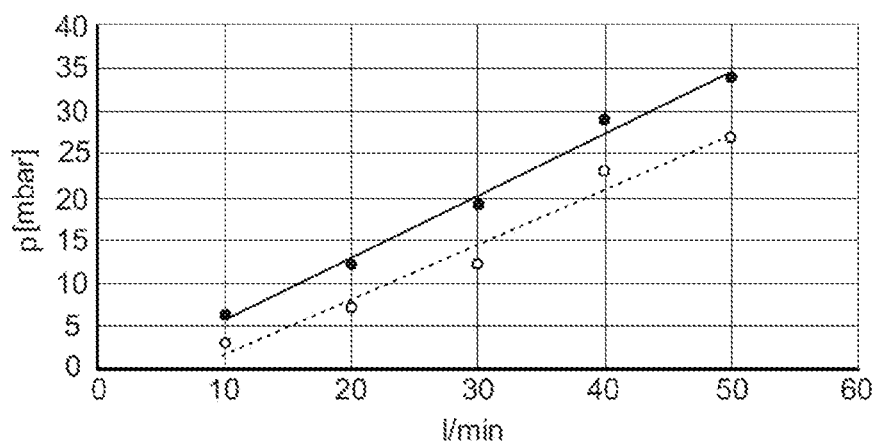
FIG. 19 shows pressure values in the filling pipe and in the operating fluid container as a function of filling volume flows.

FIG. 19 shows the pressure values plotted against the volume flow, both of the compensated pressure signal in the filling pipe 20 and of a pressure measurement in the tank. An extremely linear relationship between the pressure and filling pipe 20 can be derived therefrom, which relationship easily permits the volume flow to be determined on the basis of an acquired pressure in the filling pipe 20.

By using a pressure measurement it is easily possible to draw a conclusion about the volume flow. The resulting relationship is linear. In the case of a pressure measurement in the tank 10, this conclusion can be made without further knowledge of parameters. If the pressure in the filling tank 20 is measured, in this context the hydrostatic component of the fuel in the tank 10 must additionally be taken into account.

LIST OF REFERENCE NUMBERS

1 Operating fluid container system
10 Operating fluid container
11 Operating fluid container interior
20 Filling pipe
21 Filling nozzle
30 Non-return valve/inlet check valve
40 Pressure sensor
50 Acceleration sensor/solid-borne sound sensor
60 Volume flow sensor
70 Electronic control device
71 Data line
100 Filling device/fuel pump nozzle

What is claimed:

1. An operating fluid container system comprising:
an operating fluid container having an operating fluid container interior; and
a filling pipe for filling the operating fluid container interior with an operating fluid;
wherein the operating fluid container system has a pressure sensor, for determining pressure within the filling pipe, arranged within the filling pipe;
the pressure sensor is coupled via a data line to an electronic control device for transmitting data, representing the pressure within the filling pipe, to the electronic control device;
the control device is configured to perform a method for detecting deactivation of a filling device during a filling process of the operating fluid container whose operating fluid container interior is fillable with the operating fluid via the filling pipe, wherein the method comprises acquiring a time profile of pressure values by the pressure sensor, and outputting a filling stop signal in accordance with the time profile of pressure values; and
wherein the operating fluid container is a gasoline fuel container, a diesel fuel container or a urea container.

2. The operating fluid container system according to claim 1, wherein the pressure sensor is installed within the filling pipe such that the pressure sensor does not project beyond an inner face of the filling pipe.

3. The operating fluid container system according to claim 1, wherein the operating fluid container system has a non-return value via which the operating fluid container interior is fluidically connected to the filling pipe.

4. The operating fluid container system according to claim 1, wherein the method further comprising:
acquiring at least two pressure values within a first time period within the filing pipe by the pressure sensor;
acquiring at least two further pressure values within a second time period, chronologically following the first time period, within the filling pipe by the pressure sensor;
determining a first difference between the at least two pressure values acquired within the first time period;
determining a second difference between the at least two further pressure values acquired within the second time period; and
outputting the filling stop signal if an absolute value of the second difference is lower than an absolute value of the first difference.

5. The operating fluid container system according to claim 1, wherein the method further comprising:
acquiring a multiplicity of first pressure values within a first time period;
determining a first signal-to-noise ratio on a basis of the multiplicity of first pressure values;
acquiring a multiplicity of second pressure values within a second time period which chronologically follows the first time period;
determining a second signal-to-noise ratio on a basis of the multiplicity of second pressure values; and
outputting the filling stop signal if the second signal-to-noise ratio is larger than the first signal-to-noise ratio.

6. The operating fluid container system according to claim 1, wherein the method further comprising:
acquiring a multiplicity of first pressure values within a first time period;
acquiring a first frequency spectrum on a basis of the first pressure values;
acquiring a multiplicity of second pressure values within a second time period which chronologically follows the first time period;
acquiring a second frequency spectrum on a basis of the second pressure values; and
outputting the filling stop signal if the second frequency spectrum differs from the first frequency spectrum.

7. The operating fluid container system according to claim 1, wherein the method further comprising:
ascertaining whether the pressure values have an absolute maximum and an absolute minimum following the absolute maximum at a first time interval; and
outputting the filling stop signal if the first time interval is shorter than a predetermined time period.

8. The operating fluid container system according to claim 1, wherein the method further comprising:
performing high-pass filtering of the pressure values acquired by the pressure senor; and outputting the filling stop signal if the high-pass-filtered pressure values undershoot a predetermined lower threshold.

9. The operating fluid container system according to claim 1, wherein the method further comprising:
performing high-pass filtering of the pressure values acquired by the pressure sensor;
acquiring absolute values of the high-pass-filtered pressure values; and
outputting the filling stop signal if the high-pass-filtered pressure values which have been converted into the absolute values exceed a predetermined upper threshold.

10. The operating fluid container system according to claim 1, wherein the method further comprising:
performing high-pass filtering of the pressure values acquired by the pressure sensor;
acquiring absolute values of the high-pass-filtered pressure values;
performing low-pass filtering of the pressure values which were firstly high-pass filtered and then converted into the absolute values; and
outputting the filling stop signal if the pressure values which were firstly high-pass filtered and then converted into the absolute values and subsequently low-pass filtered exceed a predetermined upper threshold.

11. An operating fluid container system comprising:
an operating fluid container having an operating fluid container interior; and
a filling pipe for filling the operating fluid container with an operating fluid;
wherein the operating fluid container system has an acceleration sensor mounted on the operating fluid container or on the filling pipe;
the acceleration sensor is coupled via a data line to an electronic control device for transmitting acceleration data to the electronic control device;
the control device is configured to perform a method for detecting deactivation of a filling device during a filling process of the operating fluid container whose operating fluid container interior is fillable with the operating fluid via the filling pipe, wherein the method comprises acquiring a time profile of acceleration values by the acceleration sensor, and outputting a filling stop signal in accordance with the time profile of acceleration values; and
wherein the operating fluid container is a gasoline fuel container, a diesel fuel container or a urea container.

12. The operating fluid container system according to claim 11, wherein the filling stop signal is output if an acceleration value of the acceleration values exceeds a predetermined acceleration limiting value.

13. An operating fluid container system comprising:
an operating fluid container having an operating fluid container interior; and
a filling pipe for filling the operating fluid container interior with an operating fluid;
wherein the operating fluid container system has a volume flow sensor, for determining a volume flow within the filling pipe, arranged within the filling pipe;
the volume flow sensor is coupled via a data line to an electronic control device for transmitting data, representing volume flow within the filling pipe, to the electronic control device;
the control device is configured to perform a method for detecting deactivation of a filling device during a filling process of the operating fluid container whose operating fluid container interior is fillable with the operating fluid via the filling pipe, wherein the method comprises acquiring a time profile of volume flow values by the volume flow sensor, and outputting a filling stop signal in accordance with the time profile of volume flow values; and
wherein the operating fluid container is a gasoline fuel container, a diesel fuel container or a urea container.

14. The operating fluid container system according to claim 13, wherein the filling stop signal is output if a volume flow value of the volume flow values undershoots a predetermined volume flow limiting value.

* * * * *